United States Patent
Jackson et al.

(10) Patent No.: US 6,323,776 B1
(45) Date of Patent: Nov. 27, 2001

(54) METHOD AND APPARATUS OF AUTOMATICALLY IDENTIFYING FAULTS IN A MACHINE VISION MEASURING SYSTEM

(75) Inventors: David A. Jackson, Los Gatos; Hoshang Shroff, Cupertino; Donald J. Christian, Fremont; Stephen Glickman, Los Gatos, all of CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/468,743

(22) Filed: Dec. 21, 1999

(51) Int. Cl.[7] ............................................ G08B 21/00
(52) U.S. Cl. ..................... 340/679; 356/155; 382/152; 382/172; 382/176
(58) Field of Search ................... 340/679, 540, 340/680; 356/155; 382/152, 141, 148, 151, 176, 168, 172

(56) References Cited

U.S. PATENT DOCUMENTS

| | | | |
|---|---|---|---|
| 4,891,762 | 1/1990 | Chotiros . | |
| 5,218,648 | * 6/1993 | Wells et al. | 382/34 |
| 5,535,522 | 7/1996 | Jackson | 33/288 |
| 5,586,058 | * 12/1996 | Aloni et al. | 382/148 |
| 5,619,429 | * 4/1997 | Aloni et al. | 382/148 |
| 5,724,743 | * 3/1998 | Jackson | 33/288 |
| 5,768,421 | 6/1998 | Gaffin . | |
| 5,809,658 | 9/1998 | Jackson | 33/288 |
| 5,943,783 | 8/1999 | Jackson | 33/288 |
| 5,969,246 | * 10/1999 | Jackson et al. | 33/203.18 |
| 5,969,753 | 10/1999 | Robinson . | |
| 6,240,206 | * 5/2001 | Tokuyama et al. | 382/176 |

FOREIGN PATENT DOCUMENTS

| | | |
|---|---|---|
| 0495182A | 7/1992 | (EP) . |
| 0635803A | 1/1995 | (EP) . |

* cited by examiner

*Primary Examiner*—Nina Tong
(74) *Attorney, Agent, or Firm*—McDermott, Will & Emery

(57) ABSTRACT

An apparatus and method for automatically identifying faults in the operation of a machine vision measuring systems provides an improved self-diagnostic capability for machine vision based metrology and tracking systems. The method and apparatus validate performance of tracking operations, and detect deterioration that may be caused by electronic noise, environmental contamination, etc. A mathematical model of the target visualized by the system is created and stored. A target is imaged in the field and fiducials of the target are identified. Centroid positions of detected fiducials of the imaged target are compared to the centroid positions of fiducials in the mathematical model. When a fiducial is obscured or dirty, its geometric characteristics (such as centroid, brightness, edge smoothness, area, or shape) differ from the true or idealized values of the characteristics. Values representing detected fiducials are discarded when the offset exceeds predetermined criteria, or when its properties vary from ideal. If the remaining number of detected fiducials is below a predetermined threshold, a warning message is displayed or an error is generated. Thus, when a fault is detected that degrades performance beyond a preset tolerance, the fault is flagged for attention and a suggested corrective action is displayed.

18 Claims, 8 Drawing Sheets

METHOD AND APPARATUS OF AUTOMATICALLY IDENTIFYING FAULTS IN A MACHINE VISION MEASURING SYSTEM

FIELD OF THE INVENTION

The present invention generally relates to machine vision measuring systems, for example, three-dimensional computerized wheel alignment systems. The invention relates more specifically to a method and apparatus of automatically identifying faults in the operation of a machine vision measuring system caused by electronic noise, environmental contamination, or other problems.

BACKGROUND OF THE INVENTION

Machine vision measuring systems that have cameras are used in many applications. For example, wheels of motor vehicles may be aligned on an alignment rack using a computer-aided, three-dimensional (3D) machine vision alignment apparatus and a related alignment method. Targets are attached to the wheels of the vehicle to be aligned. Cameras of the alignment apparatus view the targets and form images of the targets. A computer in the apparatus analyzes the images of the targets to determine wheel position, and guides an operator in properly adjusting the wheels to accomplish precise alignment.

Examples of methods and apparatus useful in 3D alignment of motor vehicles are described in U.S. Pat. No. 5,943,783, Method and apparatus for determining the alignment of motor vehicle wheels, U.S. Pat. No. 5,809,658, Method and apparatus for calibrating cameras used in the alignment of motor vehicle wheels, U.S. Pat. No. 5,724,743, Method and apparatus for determining the alignment of motor vehicle wheels, and U.S. Pat. No. 5,535,522, Method and apparatus for determining the alignment of motor vehicle wheels. The apparatus described in these references is sometimes called a "3D aligner" or "aligner."

An example of a commercial embodiment of an aligner is the Visualiner 3D, commercially available from John Bean Company, Conway, Ark., a unit of Snap-on Tools Company.

To determine the alignment of the motor vehicle wheels, such 3D aligners use cameras that view targets affixed to the wheels. Each target comprises numerous marks that are used for the purpose of determining target position ("fiducials"). Proper operation of the aligner requires the aligner to create an image and recognize most of the fiducials on a target at any given time.

However, such aligners are normally installed in an automotive shop or other environment that is an inherently dirty environment. Normal handling of the targets by technicians can result in the targets becoming dirty. Grease, dirt or other contaminants may be deposited on the targets, obscuring one or more fiducials of the targets. Further, with some kinds of aligners that have "floating" booms and cameras, movement of the booms or cameras can cause placement of the cameras in a position at which the cameras can see only part of a target and therefore form only an incomplete image of a target.

In one current approach, if the aligner cannot recognize enough fiducials of a target, as a result of dirt, other contamination or obscuration of fiducials, or obstruction of the target, it cannot determine the location of that target, and stops operating. Although this approach ensures that the aligner operates based on an accurate view of the targets, a drawback is that the operator is not always certain why the aligner stops operating. In particular, the operator may have insufficient information film the aligner to determine why operation has stopped. The aligner simply ceases operating and the operator may therefore assume that the aligner is malfunctioning when, in fact, a dirty target is the source of the fault. When the fault involves obstruction of the target or mis-alignment of a floating boom or cameras, the operator may visually inspect the targets and yet may be unable to determine why the aligner will not operate, or may incorrectly assume that the aligner hardware or software is faulty.

Based on the foregoing, there is a clear need in this field for an apparatus and method that provides for automatic identification of faults in a machine vision measuring system.

There is a particular need for an aligner that can identify faults such as electronic noise, environmental contamination of targets, etc., and report information about the fault to an operator so that remedial action can be taken. There is also a need for an aligner that can suggest remedial action to be taken by an operator in response to detecting a fault.

SUMMARY OF THE INVENTION

The foregoing needs and objects, and other needs that will become apparent from the following description, are fulfilled by the present invention, which comprises, in one aspect, an apparatus and method for automatically identifying faults in the operation of a machine vision measuring systems. Embodiments provide an improved self-diagnostic capability for machine vision based metrology and tracking systems. The method and apparatus validate performance of tracking operations, and detect deterioration that may be caused by electronic noise, environmental contamination, etc.

A mathematical model of the target visualized by the system is created and stored. A target is imaged in the field and fiducials of the target arc identified. Centroid positions of detected fiducials of the imaged target are compared to the centroid positions of fiducials in the mathematical model. When a fiducial is obscured or dirty, its geometric characteristics (such as centroid, brightness, edge smoothness, area, or shape) differ from the true or idealized values of the characteristics. Values representing detected fiducials are discarded when the offset exceeds predetermined criteria, or when its properties vary from ideal. If the remaining number of detected fiducials is below a pre-determined threshold, a warning message is displayed or an error is generated. Thus, when a fault is detected that degrades performance beyond a preset tolerance, the fault is flagged for attention and a suggested corrective action is displayed.

In one embodiment, a method of detecting a fault of a machine vision measuring system that includes a target having a plurality of fiducials and stored image of the target and the fiducials is provided. The method involves the steps of creating and storing a list of values representing detected fiducials of the target based on the image; comparing the detected fiducials to a plurality of values representing true fiducials of the target in a stored model of the target; selectively removing one or more of the detected fiducials from the list that fail to satisfy pre-determined criteria; and generating a warning message using the machine vision measuring system when fewer than a first pre-determined number of detected fiducials remain in the list. Specific features of this aspect, and other aspects and their features, will become apparent from the following description and claims.

BRIEF DESCRIPTION OF THE DRAWINGS

The present invention is illustrated by way of example, and not by way of limitation, in the figures of the accompanying, drawings and in which like reference numerals refer to similar elements and in which.

DETAILED DESCRIPTION OF THE PREFERRED EMBODIMENT

Figure 1:
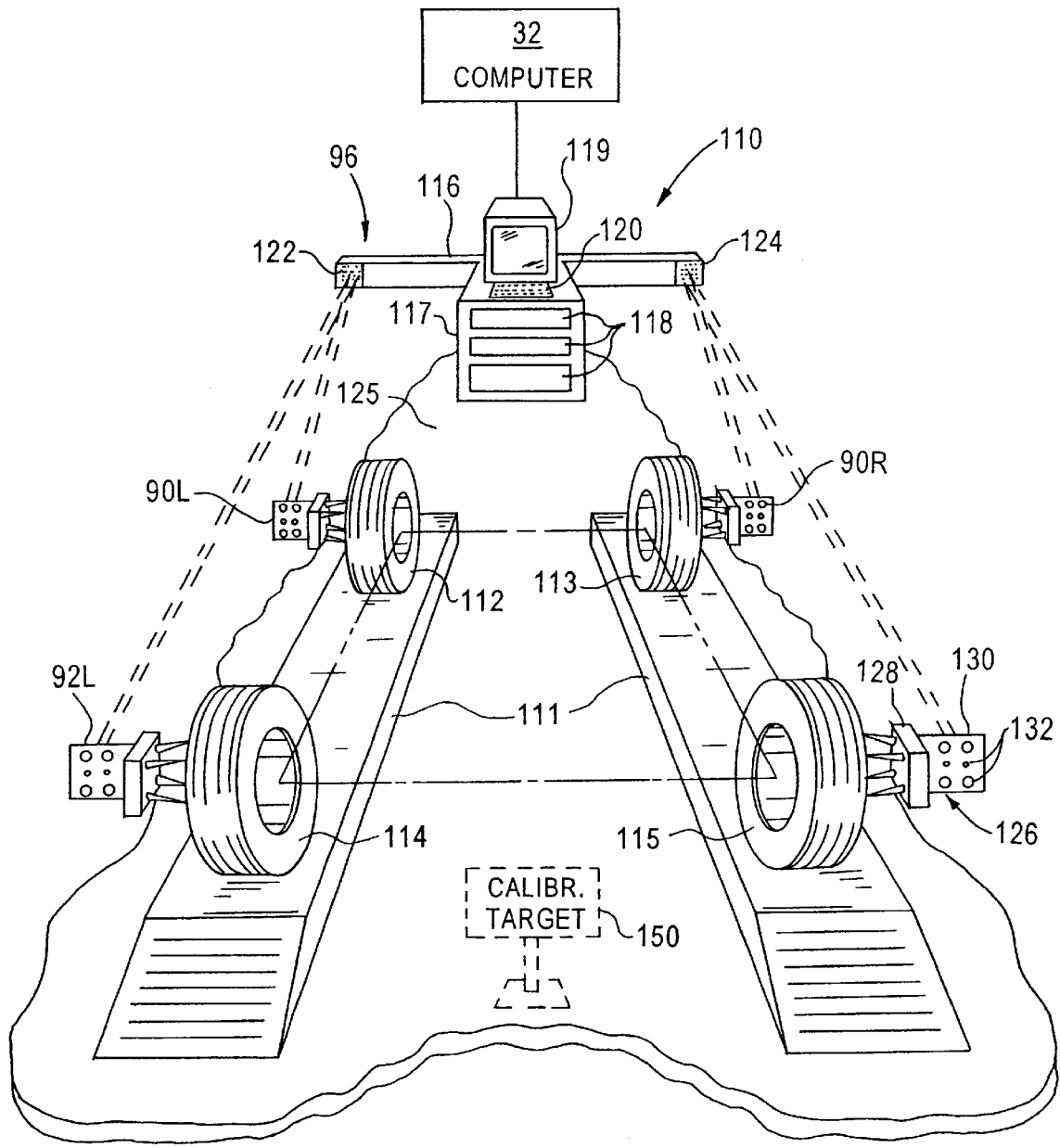
FIG. 1 is a schematic top plan view of a 3D motor vehicle alignment system.

An apparatus and method for automatically identifying faults in the operation of a machine vision measuring, systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In preferred embodiments, an apparatus and method for automatically identifying faults in the operation of a machine vision measuring systems provides an improved self-diagnostic capability for machine vision based metrology and tracking systems. The method and apparatus validate performance of tracking operations, and detect deterioration that may be caused by electronic noise, environmental contamination, etc. A mathematical model of the target visualized by the system is created and stored. A target is imaged in the field and fiducials of the target are identified. Centroid positions of detected fiducials of the imaged target are compared to the centroid positions of fiducials in the mathematical model. When a fiducial is obscured or dirty, its geometric characteristics (such as centroid, brightness, edge smoothness, area, or shape) differ from the true or idealized values of the characteristics. Values representing detected fiducials are discarded when the offset exceeds predetermined criteria, or when its properties vary from ideal. If the remaining number of detected fiducials is below a predetermined threshold, a warning message is displayed or an error is generated. Thus, when a fault is detected that degrades performance beyond a preset tolerance, the fault is flagged for attention and a suggested corrective action is displayed.

Deviations may occur in several dimensions, for example, target blob size, blob shape, axes of elongation relative to sister blobs, deviations from X and Y position relative to the local pattern of neighboring blobs, and number of blobs matched in a total target pattern. Deviations in the various dimensions are individually measured and algorithmically combined to produce a noise vector. The noise vector is evaluated against an alarm threshold to determine whether a significant problem has been encountered. The process is repeated and a determination is independently made for each and every image. Images are regularly and periodically input from the cameras.

In one embodiment, the invention provides a self-diagnostic capability for automotive wheel aligners. Embodiments also may be used with other vision-based measurement, tracking and monitoring systems. Generally, the invention is most useful with tracking equipment that observes passive or retroreflective targets or objects. A preferred embodiment is implemented in the form of one or more computer programs, processes, or routines that are executed by an aligner of the type shown in the 658 patent or 522 patent cited above.

In one specific embodiment, the aligner is programmed to determine when a target is dirty, and to stop operation if the position of more than a predetermined number of fiducials cannot be determined. For example, in one embodiment the aligner is programmed to stop operation when fewer than approximately 25 of 33 fiducials of any one target are identified by the system in operation. If a second predetermined number of fiducials (e.g., 29), or fewer, are visible in any one target, the system generates a warning message to the operator that system failure is imminent and the target must be cleaned, but continued operation is permitted.

In another specific embodiment, a system is configured to check for obstructions in the field of view that may be caused by an object or a fault such as dirt or dust on a target. The system measures optical deviations between the observed actual target and an internally memorized model of an ideal target. The deviations indicate faults due to dropouts or obstructions that can be caused by, for example, electronic imager faults or noise, dirt or foreign objects on the target, dirt or foreign objects on the camera lens, solid or gaseous obstructions or obscurations between camera and target, etc.

In alternative embodiments, the system also provides a tool to help the operator discriminate between the various types and locations of faults. These functions are accomplished using image mapping and target modeling techniques. During normal operation, the pose and position of the targets are measured and tracked, as described in the 522 patent cited above. The system compares each visually observed target and its fiducial pattern against a corresponding idealized model pattern that is stored in memory. Deviations between the memorized ideal and the observed target are computed and measured. Deviations in certain dimensions whose magnitude are below a predetermined alarm threshold are deemed to be insignificant, and do not raise an alarm signal.

Embodiments may be used in conjunction with the aligners illustrated and described in U.S. Pat. No. 5,943,783, Method and apparatus for determining the alignment of motor vehicle wheels, U.S. Pat. No. 5,809,658, Method and apparatus for calibrating cameras used in the alignment of motor vehicle wheels, U.S. Pat. No. 5,724,743, Method and apparatus for determining the alignment of motor vehicle wheels, and U.S. Pat. No. 5,535,522, the entire disclosures of which are hereby incorporated by reference as if fully set forth herein.

FIG. 1 is a schematic top plan view of certain elements of a computer-aided, 3D motor vehicle wheel alignment system ("aligner") 110 is shown. Aligner 110 has a pair of fixed, spaced-apart camera/light source subsystems 122, 124. A four-wheeled vehicle positioned on a lift ramp 111 for wheel alignment is suggested by the four wheels 112, 113, 114, and 115. In the usual case, the rack 111 will include pivot plates (not shown) to facilitate direction change of at least the front wheels.

A superstructure 96 includes a horizontally extending beam 116 affixed to a cabinet 117. The cabinet 117 may include a plurality of drawers 118 for containing tools, manuals, parts, etc. Alternatively, cabinet 117 may comprise a stand, rigid set of legs, or other support structure. Cabinet 117 may also form a support for a video monitor 119 and input keyboard 120. Computer 32 is coupled to video monitor 119 and input keyboard 120 and may be located within cabinet 117 or in another location. Computer 32 operates under control of one or more stored programs that implement the processes and methods described in this document. The programs are generally preloaded before installation of aligner 110 in a shop environment.

Left and right camera and light source subsystems 122, 124 ("camera/light subsystems" or "cameras") are mounted at each end of the beam 116. The length of beam 116 is chosen so as to be long enough to position the camera/light subsystems outboard of the sides of any vehicle to be aligned by the system. The beam and camera/light subsystems 122, 124 are positioned high enough above the shop floor 125 to ensure that the two targets 90L, 92L on the left side of the vehicle are both within the field of view of camera assembly 122, and the two targets 90R, 130 on the right side of the vehicle are both within the field of view of camera assembly 124. In other words, the cameras are positioned high enough that their line of view of a rear target is over the top of a front target. This can, of course, also be accomplished by choosing the length of beam 116 such that the cameras are outside of the front targets and have a clear view of the rear targets.

Details of the camera/light subsystems 122, 124 are discussed in the above-referenced patent disclosures, e.g., in FIG. 10 of the '658 patent, and the accompanying text. In brief, mounted within of beam 116, each camera/light subsystem 122, 124 includes a lighting unit, comprised of a plurality of light emitting diode (LED) light sources arrayed about an aperture through which the input optics of a suitable video camera is projected. The light array in the preferred embodiment includes 64 LEDs (a lesser number being shown for simplicity of illustration) which provide a high-intensity source of on-axis illumination surrounding the camera lens, to ensure that maximum light is retro-reflected from the targets. In order to discriminate against other possible sources of light input to the camera, a narrow band filter matched to the light spectrum of the LEDs may be positioned in front of the lens. Although any suitable type of video camera can be utilized, in accordance with the preferred embodiment a CCD device is utilized. This camera has a resolving power suitable for the present application.

In accordance with this embodiment, a target device 126, including a rim-clamp apparatus 128 and a target object 130, is attached to each wheel. A suitable rim-clamp mechanism is discussed in U.S. Pat. No. 5,024,001 entitled "Wheel Alignment Rim Clamp Claw." As will be described in more detail below, the preferred target object has at least one planar, light-reflective surface with a plurality of visually perceptible, geometrically configured, retro-reflective target elements 132 formed thereon. Such target surfaces may be formed on one or more sides of the target object. In use, each target must be positioned on a vehicle wheel with an orientation such that the target elements are within the field of view of at least one of the camera/light subsystems.

A computer-generated quasi three-dimensional representation of the wheels being aligned may be depicted on the video monitor 119 under control of programs of computer 32, along with suitable indicia evidencing the detected alignment. In addition, alphanumeric and/or pictorial hints or suggestions may be depicted to guide the technician in adjusting the various vehicle parameters as required to bring the alignment into conformance with predetermined specifications. These functions are implemented by programs of computer 32. An example of a commercial product that is suitable for use as aligner 110 is the Visualiner 3D, commercially available from John Bean Company, Conway, Ark.

Figure 2:
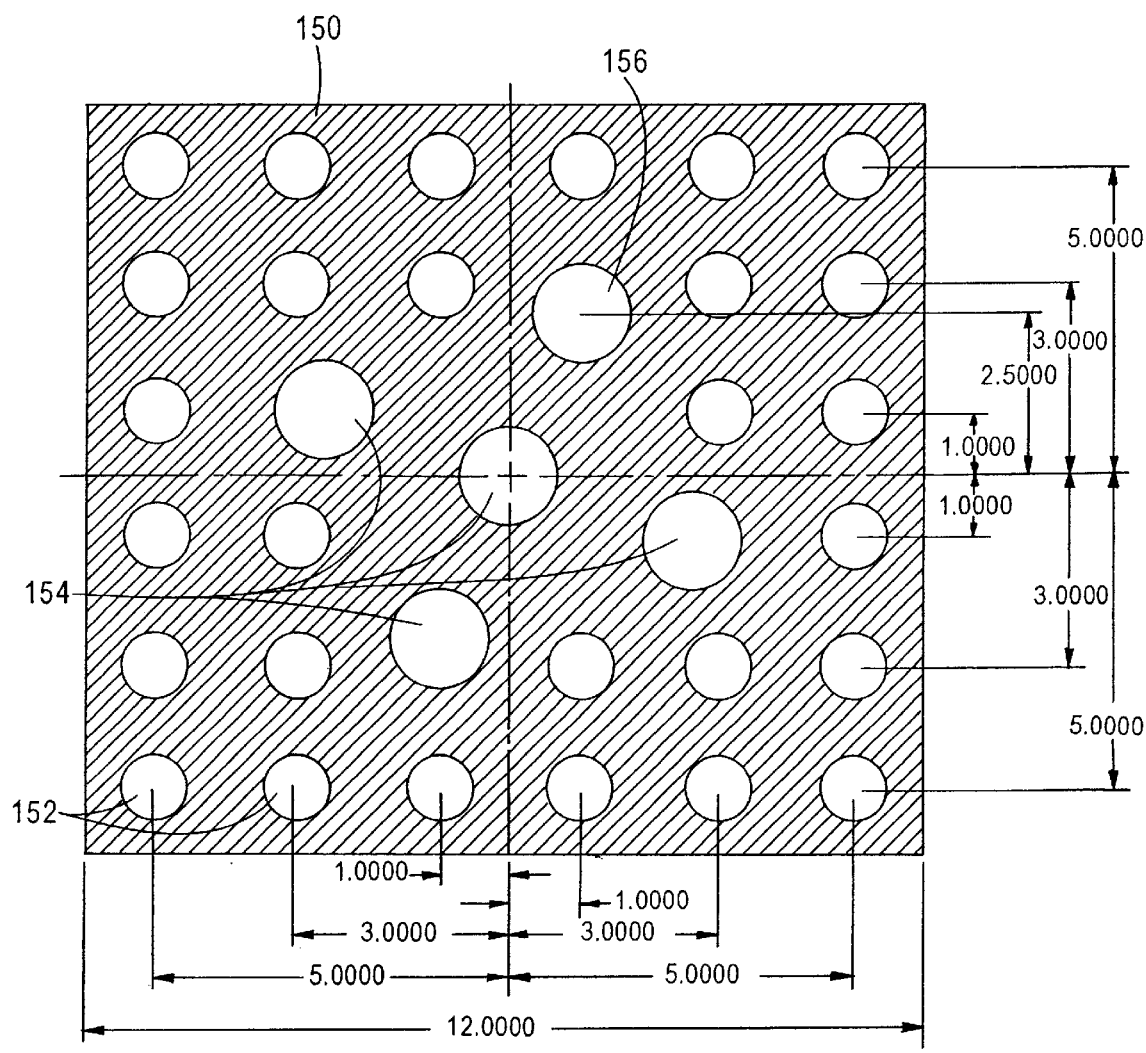
FIG. 2 is a top plan view of an alignment target that may be used in an embodiment.

FIG. 2 is a top plan view of an alignment target 150 that may be used in an embodiment as targets 90L, 92L, 90R, 130.

Target 150 is an example of a target in accordance with a preferred embodiment and includes a plurality of light-reflective, circular target elements or dots of light-colored or white retro-reflective material disposed in an array over a less reflective or dark-colored of a rigid substrate. Suitable retro-reflective materials include Nikkalite™ 1053 sold by Nippon Carbide Industries USA, Scotchlite™ 7610 sold by 3M Company, and D66-15xx™ sold by Reflexite, Inc.

The target 150 includes multiple circular dots so as to ensure that sufficient data input may be grabbed by the camera even in the case that several of the target elements have been smudged by handling or are otherwise not fully detectable. In accordance with the preferred embodiment a well-defined target includes approximately 30 circular dots very accurately positioned (within 0.0002") with respect to each other. By way of specific example, the target illustrated in FIG. 2 might include 28 circular dots, each having an area one unit, very accurately positioned on a 12"×12" grid, with four dots having an area of 1.5 units, and a single dot having an area of 2 units, strategically positioned within the array. The precise size and spacing of the dots is not critical provided that dots having a plurality of different area measurements are used, and the area measurements and relationship of the dots having different area measurements is known and stored in advance.

In this configuration, in operation each of the cameras 122, 124 views the physical targets 90L, 92L, 90R, 130. Computer 32 receives images formed by the cameras and under program control, creates a stored image of the targets. In memory, computer 32 also has a pre-defined mathematical representation of an image of an ideal target (the "target model") and a mathematical representation of the camera system ("camera model"). As a result, computer 32 can create and store in its memory a representation of an image ("hypothesized image") that the target model would have produced when viewed through the camera model, as if the target model and camera model are a physical target and camera. Computer 32 can then compare the hypothesized image to a stored image formed by the cameras 122, 124 by viewing physical targets 90L, 90R, 92L, 130.

By mathematically moving values representing the mathematical position of a modeled target until the mathematical position and orientation of the projected dots line up with the dots of the real target in the real image, position and orientation information can be obtained. This mathematical manipulation of a well defined target until it is oriented the same way as the image is called "fitting the target." Once the fitting is accomplished, the position and orientation of the target is very accurately known, e.g., within 0.01" and 0.01 degree. Such accuracy is obtainable because the target is made to very strict tolerances and because the design enables measurement of many points, e.g., 1,500 measured points from 30 or so fiducials (dots) each with 50 detected edge points. Furthermore, the use of sub-pixel interpolation enhances the accuracy of measurement to beyond the pixel resolution of the cameras.

The target is typically manufactured using a photolithographic process to define the dot boundaries and ensure sharp-edge transition between light and dark areas, as well as accurate and repeatable positioning of the several target elements on the target face. The target face may also be covered with a glass or other protective layer. Note that since all information obtained from a particular target is unique to that target, the several targets used to align a vehicle need not be identical and can in fact be of different makeup and size. For example, it is convenient to use larger rear targets to compensate for the difference in distance to the camera.

Figure 3A:
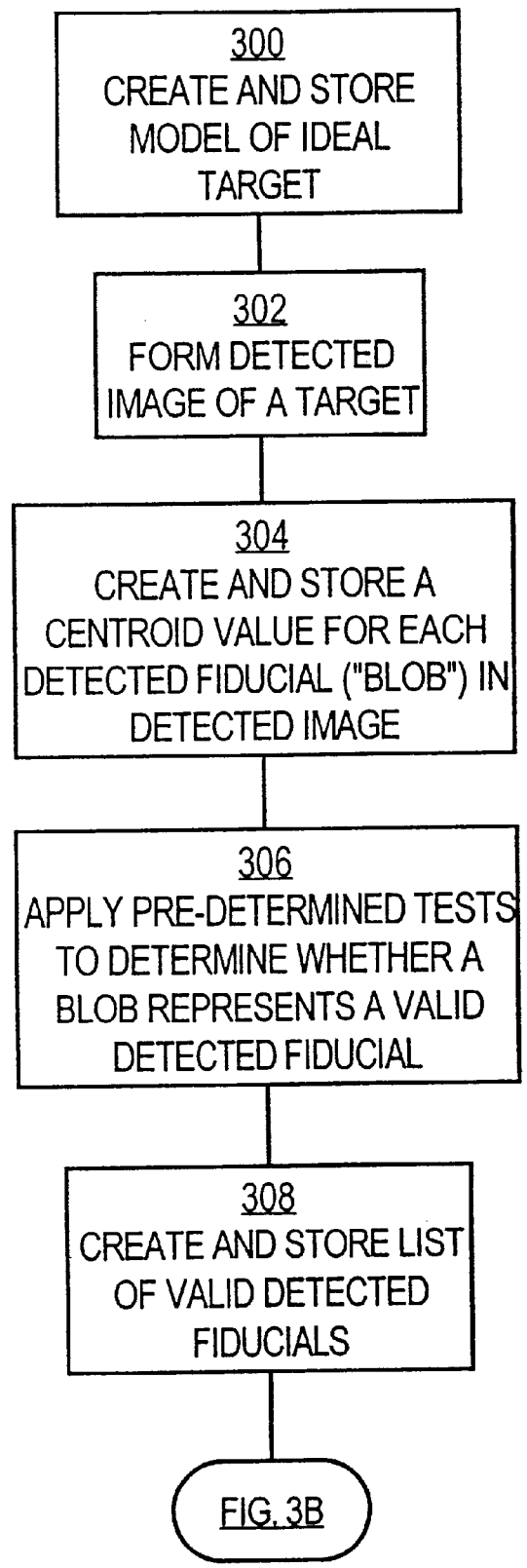
FIG. 3A is a flow diagram of a process of locating fiducials and target.
Figure 3B:
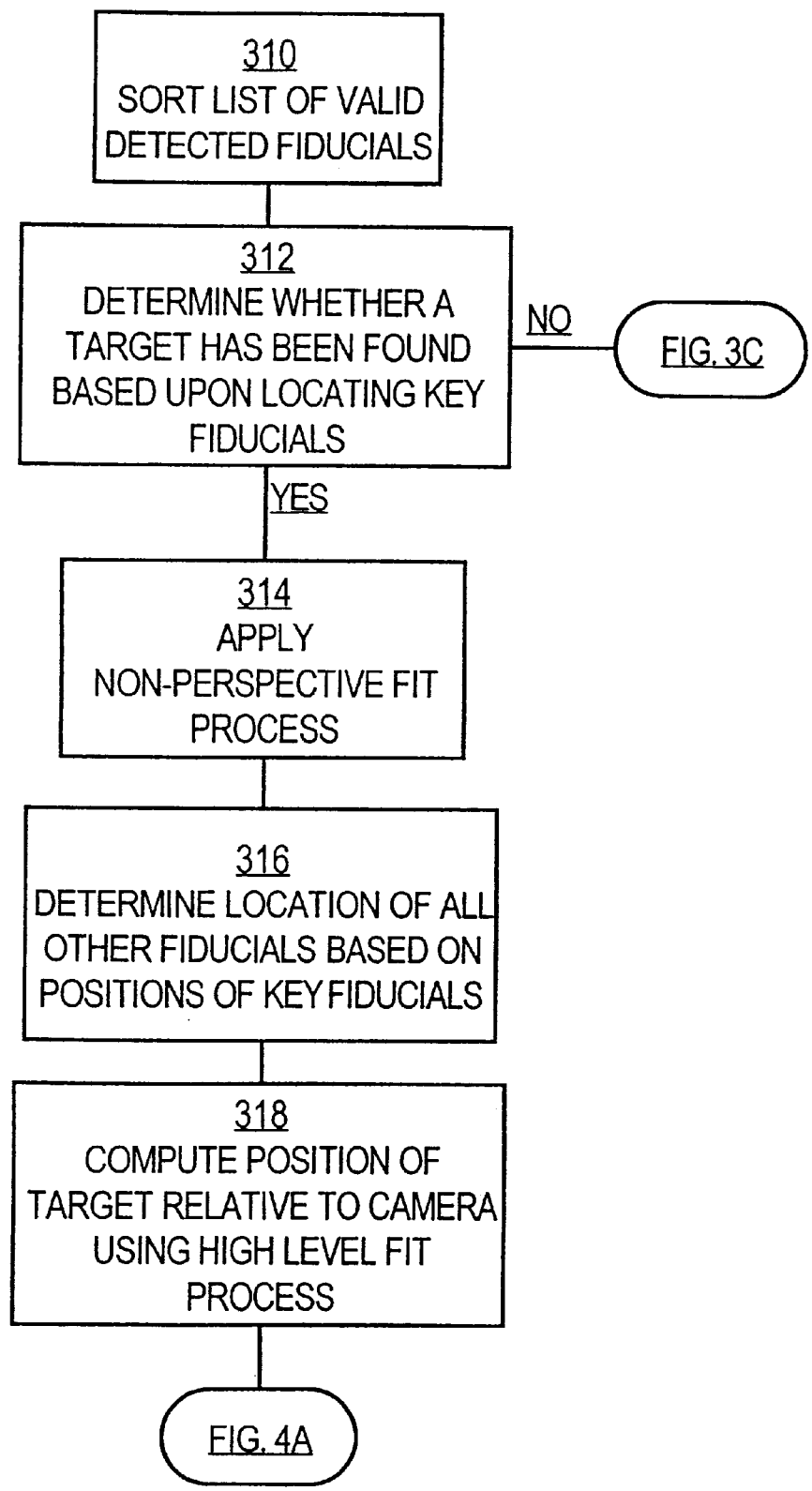
FIG. 3B is a flow diagram of further steps in the process of FIG. 3A.
Figure 3C:
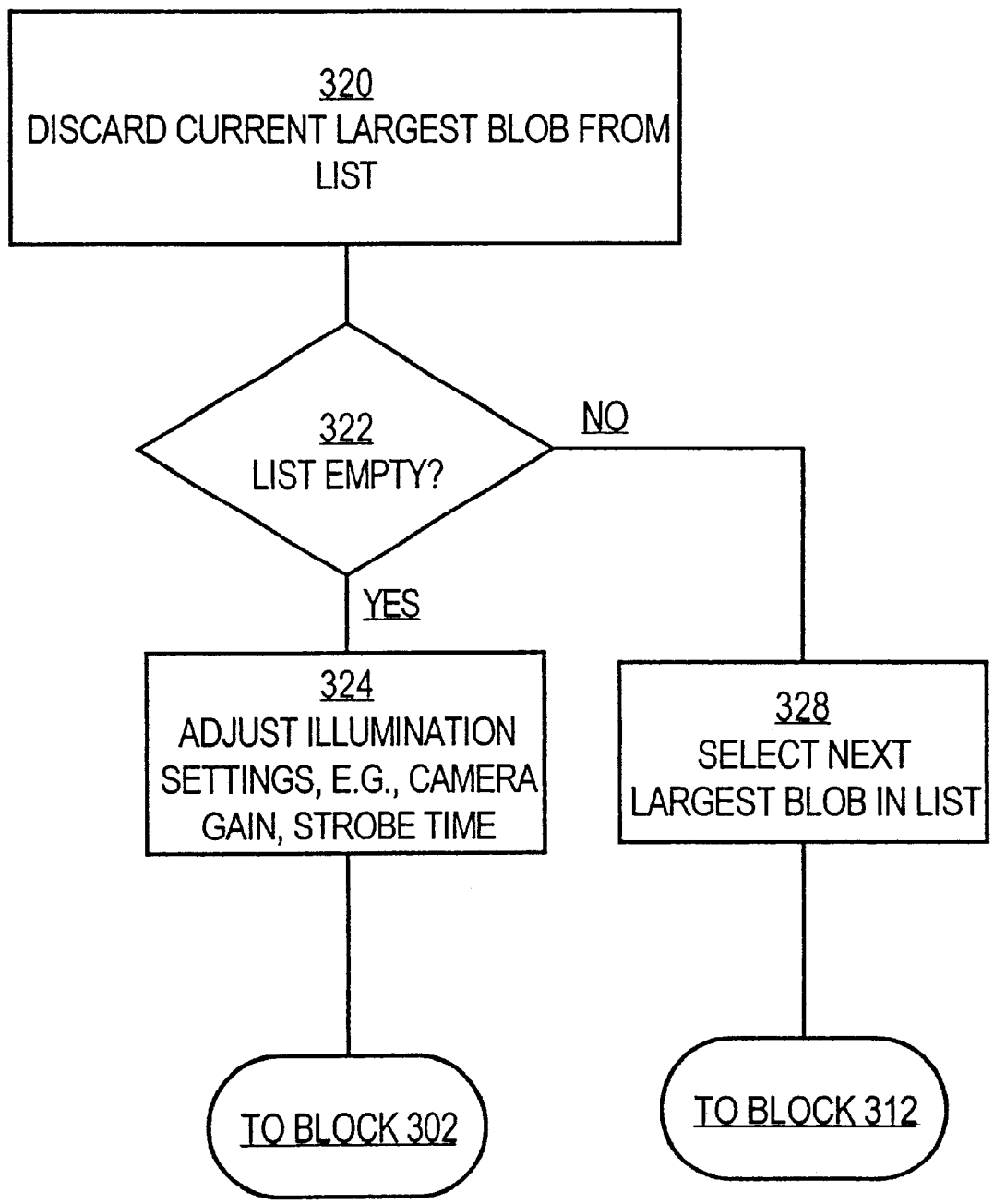
FIG. 3C is a flow diagram of further steps in the process of FIG. 3B.
Figure 4A:
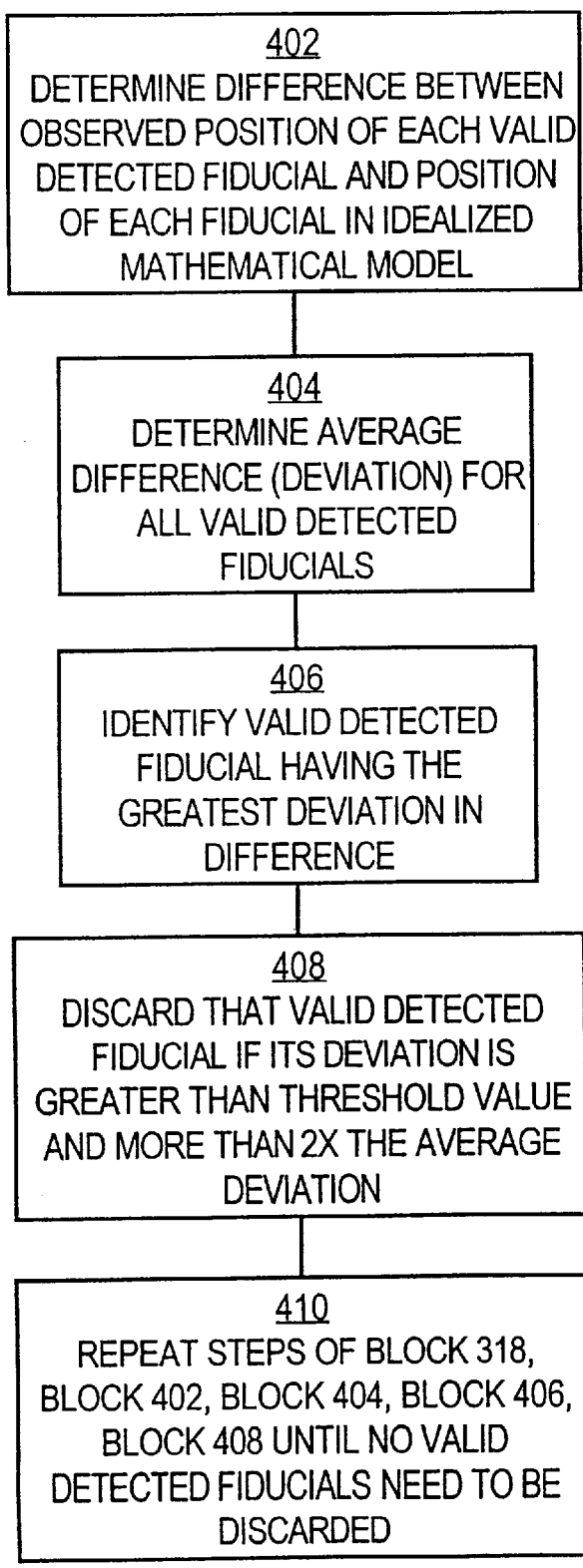
FIG. 4A is a flow diagram of a process of determining whether a target has a fault.
Figure 4B:
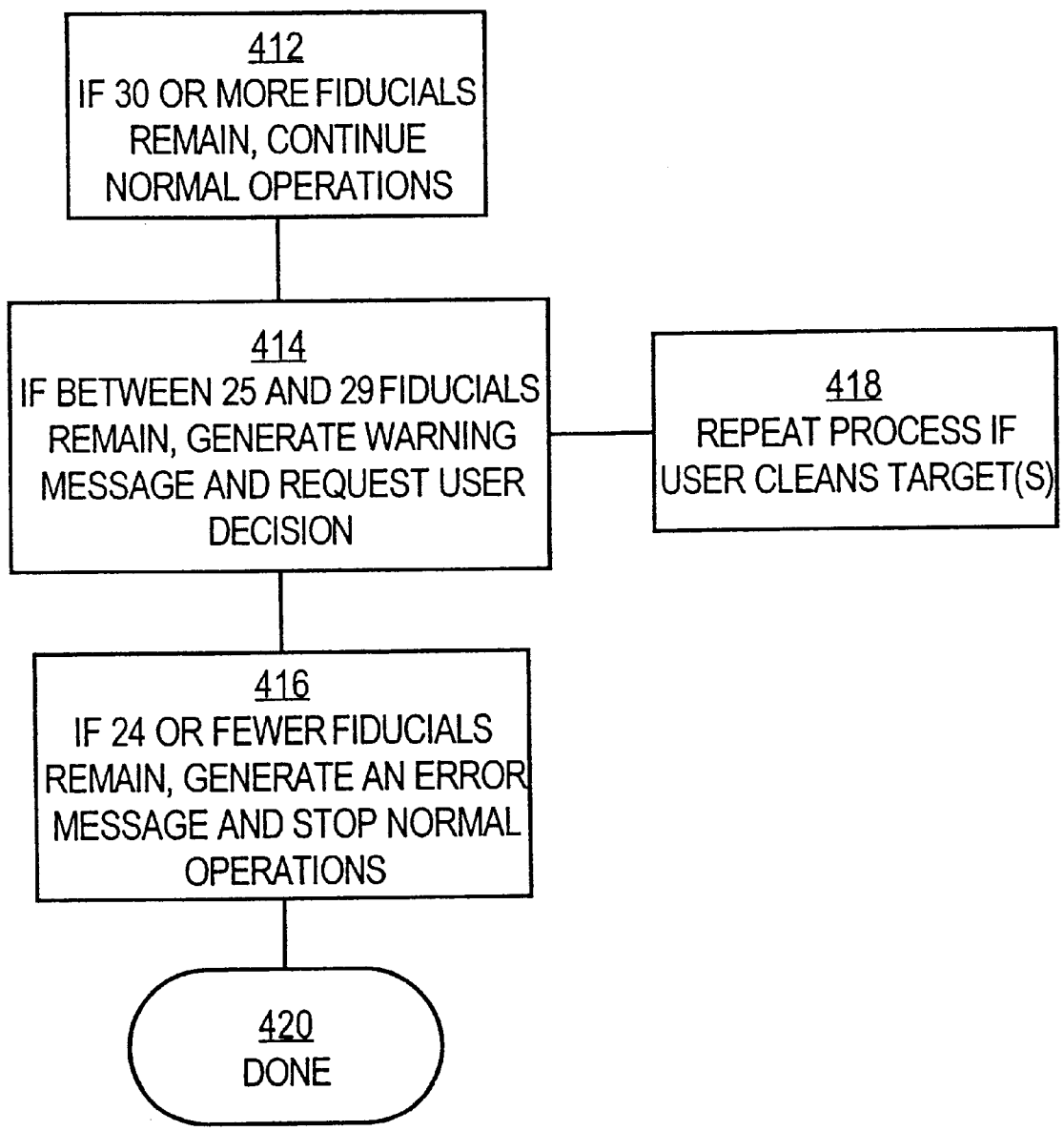
FIG. 4B is a flow diagram of further steps in the process of FIG. 4A.

FIG. 3A is a flow diagram of a process of locating fiducials and a target. FIG. 3B and FIG. 3C are flow diagrams of further steps in the process of FIG. 3A. FIG. 4A is a flow diagram of a process of determining whether a target has a fault. FIG. 4B is a flow diagram of further steps in the process of FIG. 4A. In one embodiment, the steps of FIG. 3A, FIG. 3B, FIG. 3C, FIG. 4A, FIG. 4B are implemented in the form of one or more computer programs, processes, or subroutines that are stored and executed by computer 32 of FIG. 1.

Referring first to FIG. 3A, in block 300 a mathematical model that represents an ideal image of a target is created and stored. Normally the steps of block 300 are called out when a computer program embodying the process of FIG. 3A is developed. For example, the mathematical model is defined in a data file or in data values that form an integral part of the program, or using some other mechanism such that it is available when the program initializes and executes. The mathematical model defines the size, location, and separation of the fiducials of the target, e.g., a target 150 of the type shown in FIG. 2.

In block 302, an image of the target is formed, for example, using cameras 122, 124. The detected image is stored in memory, e.g., main memory or a disk storage unit within computer 32. If the camera 30 is viewing target 150, then the detected image is will contain one or more images of light spots reflected from the fiducials of target 150. At this point in the process, it is unknown whether any of the light spots are actually fiducials of a target, and therefore for purposes of explanation, light spots in the detected image are called "detected fiducials" or "blobs".

In block 304, a centroid value is created and stored for each detected fiducial or blob in the detected image. In this context, "centroid" refers to a point in the detected fiducial or blob whose coordinates correspond to the center of mass for a thin plate of uniform thickness and consistency having the same boundary as the detected fiducial or blob. Block 304 may also involve creating and storing values that represent the major axes of a blob, and the area or size of the blob. The centroid computation methods described in U.S. Pat. No. 5,809,658 may be used.

In block 306, pre-determined tests arc applied to determine whether a blob represents a valid detected fiducial, based on the centroid value. In one embodiment, the pre-determined tests determine whether the area of the blob is larger than a certain pre-determined size and smaller than a second pre-determined size. The relative size of each target fiducial, and the relative distance of a particular fiducial to neighboring fiducials, are known and are stored in memory of the aligner as part of the mathematical model created in block 300. Accordingly, detected fiducials may be determined to be valid based on its variance from the expected sizes of fiducials as indicated by the mathematical model, or in terms of variance of their centroid values from the expected locations of the centroids as indicated by the mathematical model. In the pre-determined tests, data for a blob is discarded or ignored if its values are outside the normal range of values.

Other tests may be called out to determine whether a blob in an image represents a valid fiducial. For example, in one test a blob is determined to be a valid fiducial only if the perimeter of the blob is relatively smooth, or uniformly convex, as determined by examining the boundary of pixels that represent the blob and the background of the target, and has all of the quantified geometric properties that fall within the expected tolerance of the system. In one embodiment, a blob is recognized as a valid detected fiducial only when its detected edges project one pixel or less above a hypothetical line tangent to the edge of the blob. Other tests may be used, for example, a test that detects excessive eccentricity of a blob, or excessive tilt of a blob in the detected image. Eccentricity is the amount by which a blob is non-circular, i.e., elliptical or "squashed". Tilt represents the major axis of an eccentric blob.

In block 308, based on the results of the tests of block 306, a list of blobs that represent valid detected fiducials is created and stored. Each entry in the list comprises information that identifies a valid detected fiducial and includes dimension and centroid information. The list may be stored in main memory in the form of a linked list of record data structures, or any other suitable form of data storage.

In block 310, the list is sorted by size such that the largest detected fiducial is placed at the top of the list. Block 310 may involve determining the area value of each detected fiducial in the list, computing a median area value, and assuming that the median area value is equal to the one unit area of fiducials 152. Alternatively, the largest detected fiducial is detected and identified by scanning the list. Referring again to FIG. 2, large fiducial 156 has an area that is 200% as large (2X) as the area of small fiducials 152. Fiducials 154 have an area that is 150% as large (1.5X) as the area of small fiducials 152. Accordingly, the largest detected fiducial in the sorted list is assumed to be fiducial 156 of a target of the form of target 150. The remaining detected fiducials are then examined to determine whether they correspond to the expected size of other fiducials in a target. For example, if there are four (4) fiducials neighboring the largest fiducial that are 150% in size, the neighboring fiducials are assumed to correspond to fiducials 154.

In block 312, the process determines whether a target has been located, based upon locating one or more key fiducials of the target. In one embodiment, fiducials 156, 154 are considered key fiducials and if they are located in a specified pattern, such as a five-point or asterisk arrangement, the process determines that it has found a target in the detected image. Pre-determined criteria may be used to locate the key fiducials in the specified pattern. For example, in one test, three (3) detected fiducials that are assumed to correspond to fiducials 154 must be aligned approximately in a first straight line. Two (2) detected fiducials must fall approximately in a second straight line that intersects the large fiducial 156, and the two straight lines must intersect with their midpoints at a common point. If these pre-determined criteria arc satisfied, then a target has been identified.

If the pre-determined criteria are not satisfied, then it is assumed that the largest blob is spurious or otherwise does not represent the largest fiducial 156 of target 150. Accordingly, the process will test the next largest blob in the list to determine if it represents the largest fiducial 156. To do so, control passes to block 320 of FIG. 3C. In block 320, information representing the current largest blob is discarded from the list. In block 322, the process tests whether the list of blobs is empty as a result of carrying out the discard operation of block 320. If so, there are no other blobs left for consideration, and the process takes steps to acquire a new image and attempt to detect fiducials in the new image. The assumption is that either the camera settings or the light level used to for an image in block 302 were incorrect. Thus, in block 324, illumination settings of the aligner are adjusted. For example, a gain value of camera/light source subsystems 122, 124 are increased or decreased, or the period during which the light sources of camera/light source subsystems 122, 124 are on ("strobe time" ) is increased or decreased. Control then passes to block 302 in order to form a new image with the new illumination settings and re-attempt recognition of fiducials and a target.

The loop process represented by block 320, block 322, block 324, and block 302 may be repeated indefinitely until a target is successfully recognized. Alternatively, the process may be repeated a pre-determined number of times, after which an error condition may occur. The error condition may involve generating an error message in video monitor 119. Alternatively, the error condition may involve displaying a prompt in video monitor 119 to the operator that requests the operator to check the position of the targets and the camera and provide user input when the check is complete. In response to such user input, control may be passed to block 302 and the process may re-attempt to recognize a target and fiducials.

If the test of block 322 is false, that is, if the list contains additional candidate blobs that could represent the largest fiducial 156, then in block 328, the next largest blob in the list is selected. Control then passes to block 312 to re-attempt recognition of other fiducials and the target.

When the steps of block 312 are successful, the process has determined that five (5) of the detected fiducials correspond to fiducials 154, 156 of target 150. In block 314 and block 316, the location of as many other fiducials as possible is determined, based on the positions of the five (5) key fiducials, and by applying a non-perspective fitting process.

In the perspective case, the imaging system is mathematically modeled as a "pinhole camera." All points on the 3-D target object are projected through the image plane to a single point. The 2-D coordinates of the point on the image plane where a point on the target is projected is given by a ratio of mathematical expressions involving the 3-D coordinates of the point on the target and parameters describing the position of the target relative to the camera. These parameters are Xt, Yt, Zt, pitcht, rollt, and yawt. Fitting involves adjusting these parameters to minimize the sum of the squared distances between the projected points on the image plane and the corresponding measured points on the real camera image. This process is usually referred to as least-squares fitting. Because the perspective projection involves a ratio of terms, finding the best fit parameters requires an iterative process. As a first approximation, the target is assumed to be relatively large and far from the camera. In this case, changes in the denominator term of the ratio as a function of the parameters are small compared to changes in the numerator term, and the denominator term can be approximated as a constant. With this approximation, the value of the parameters that minimize the sum of the squared distances can be mathematically determined in a single calculation, rather than the repeated calculations required in the iterative process. This approximation, which yields close-to-correct starting values of the parameters for use in the more accurate iterative perspective fit, is referred to as the non-perspective fit.

Once the non-perspective fit is obtained, a projection of all other fiducials can be calculated. Thus, the process calculates the location of the rest of the fiducials based on the positions of the five large fiducials 156, 154. For example, the list of detected fiducials is examined and location information associated with each detected fiducial is compared to the expected position of fiducials in the target as indicated by the mathematical model created in block 300. Any detected fiducial having a position that corresponds to an expected position of a fiducial is designated as a valid detected fiducial.

As a result, in an ideal case, all fiducials of the target are located and all detected fiducials in the list are designated as valid detected fiducials. In practice, any number of fiducials between five (5) and the maximum number of fiducials in the target may be located; the five (5) largest fiducials are always located when the process reaches block 316, and depending on the image formed by the camera, any number up to the maximum number of fiducials in the target may be recognized. In one embodiment, the maximum number of fiducials in the target is 33, however, targets with fewer or more fiducials may be used.

In block 318, the position of the target in space is computed. Preferably, a high level fit process is used to compute the position of the target in space. The fitting process generally involves projecting points in the mathematical model that identify the target to expected positions in space, based on the previously determined locations of the fiducials ("fitting the target," resulting in creating a "fitted target"); comparing the projected, expected points to the actual position of points on the target as determined from the detected image and the image produced by fitting the target model; and measuring the distance from the expected points to the actual position of the points. In a preferred embodiment, the difference values are computed using root mean square methods and are therefore referred to as RMS values. Preferably, RMS values are expressed in storage in the form of quantities of pixels. For example, a typical difference value is 0.05 pixels. The detected image and the fitted target are aligned as closely as possible.

Thus, a mathematical model of the theoretical target position is constructed, and an image is formed of the actual position, and the images are compared. Theoretically, the models line Up exactly and there is no difference in pixels between the theoretical position and the actual position. In practice, however, when a target contains many fiducials (e.g., 33 fiducials), it is almost impossible for an aligner to compute a perfect alignment of the models. Therefore, the difference between the observed position of each valid detected fiducial and the position of each fiducial in the mathematical model is computed, as shown in FIG. 4A, block 402. The average RMS value is required to be below a pre-determined threshold, e.g., 0.1 pixels, for a list of detected fiducials to be valid.

Assume now that a dirt smudge or other fault completely obscures one fiducial 152 of a target 150. If this occurs, the camera image does not include a blob corresponding to the obscured fiducial, so no blob in that position is centroided, added to the list of fiducials, or otherwise processed using the system, and fewer than the maximum number of fiducials in the target arc identified. The steps of FIG. 4B, discussed further below, are used to determine whether the target is dirty, that is, whether so many fiducials are obscured that the aligner cannot operate properly.

Now assume that a fiducial 152 of target 150 is only partially obscured or blocked by dirt or other contamination or conditions. The centroid of a blob in the detected image corresponding to the partially obscured fiducial will have a computed value that is offset from the true centroid of the fiducial 152 of the target 150. If the magnitude of the offset in centroid position is not sufficient for the blob to fail the pre-determined criteria described above in connection with block 306, other measures are needed to detect the fault in the target.

Accordingly, in block 404, the average difference or deviation of centroid position is computed for all valid detected fiducials that are currently in the list. In block 406, the valid detected fiducial in the list having the greatest deviation or difference value is identified. Thus, block 406 involves identifying the worst case of deviation among the detected fiducials in the list. In block 408, that fiducial is discarded from the list, or otherwise ignored or marked to be ignored in later processing steps, if its deviation value is greater than a pre-determined threshold value, and its deviation value is greater than a predetermined multiple of the average deviation value. An example of the pre-determined threshold is 0.1 and an example of the pre-determined multiple value is 2. For this example, assume that the list of blobs includes one blob with a deviation value of 0.3 pixels, and the average deviation value is 0.06 pixels. This blob would be discarded from the list because 0.3 pixels is greater than the first threshold of 0.12 (pre-determined multiple 2×0.06) even though it is greater than the pre-determined threshold of 0.1. Now assume a blob has a deviation value of 0.09 pixels with an average deviation value of 0.04 would not be discarded, because 0.09 is less than 0.1 even though 0.09 is greater than 0.08 (2×0.04).

In block 410, the steps of block 318, block 402, block 404, block 406, and block 408 are repeated until no valid detected fiducials need to be discarded. Thus, the process re-fits the target, re-computes the difference or deviation values, re-computes the average deviation value, and again discards the blob having the worst deviation value if the foregoing criteria are satisfied. This sequence of steps is repeated until all blobs in the list satisfy the criteria. The total number of fiducials remaining in the list is then determined.

Referring now to FIG. 4B, block 412, if the total number of fiducials remaining in the list is 30 or more, then the target 150 is considered clean, or the aligner is considered within the normal operating range, and normal aligner operations may continue.

In block 414, if between 25 and 29 fiducials remain in the list, that is, if any one target is found to have 25 to 29 non-obscured fiducials, then a warning message is generated that requests the user or operator to determine whether to continue operations. In one embodiment, the warning message informs the operator that the target is dirty and must be cleaned to ensure proper operation. However, operation is permitted to continue. In one preferred embodiment, the warning message comprises a graphic representation of an arrow, displayed adjacent to a graphic representation of a wheel of the motor vehicle that is undergoing alignment and that has the dirty target, a pictorial or iconographic representation of a target cleaning, and a dialog box that requests the operator to response "OK" or "Abort."

If the operator selects the "OK" response, then it is assumed that the user has cleaned the target, and as indicated by block 418, the process repeats the process described above. If the same target or a different target is still found to be dirty, the system generates a warning message that identifies the dirty target. If the operator selects the "Abort" option, then the system proceeds to carry out normal aligner operation, that is, the system interprets the operator's response as instructing the system to ignore the dirty target fault and proceed with operation. This procedure is followed because it has been found in practice that aligner accuracy is preserved when 25 or more fiducials are observable in each target.

As shown by block 416, if 24 or fewer fiducials remain in the list, an error message is generated and the aligner stops normal operations. In one preferred embodiment the error message instructs the operator that the target needs to be cleaned, or that an obstruction between the target and camera exists, and that the aligner has shut down. Alternatively, the error message may prompt the operator to clean the target and to provide user input indicating that the target has been cleaned, after which the aligner may resume normal operations.

The description above states that certain responsive actions are taken when the process results in detecting 30 or more fiducials, between 25 and 29 fiducials, or 24 fiducials or less. These specific numeric values (30, 25–29, 24 or fewer) represent one implementation for a target having 33 fiducials. However, these values are not critical, and different values may be used, especially in connection with targets that have more or fewer fiducials.

Further, proper aligner operation can be achieved using fewer than the specified number of fiducials if the remaining fiducials are uniformly distributed. Thus, aligner 110 can continue operating until so many fiducials are obscured or unobservable that aligner 110 can no longer compute an adequate fit of the target. In this context, uniform distribution means adequately spanning the visible area of a target.

The foregoing process may be carried out once, e.g., at the start of the day or when the aligner is first turned on for use, or repeatedly during the day, during alignment operations, etc. In an alternative embodiment, the process is carried out periodically during a period of use by an operator, e.g., after each alignment operation. In this embodiment, the process may be used to monitor target condition and notify the operator as soon as a target becomes dirty through use or becomes obscured as a result of the position of the cameras or boom. In still another alternative embodiment, the aligner is programmed to know the relative or absolute locations in space of the cameras, boom, and other hardware elements of the aligner. The aligner tracks the positions of these elements compared to the positions of the targets, and if the aligner determines that the target is obstructed, the aligner displays a warning message requesting the operator to remove the obstruction.

In yet another alternative embodiment, the system creates and stores in memory, for reference continuously during operation of the aligner, a list of currently recognized fiducials, and a count of the number of recognized fiducials for each target. If the system detects that the count of recognized fiducials has suddenly decreased by a significant amount in a pre-determined period of time, the system reports an error other than a dirty target error, because such a change is not likely to result from a dirty target, but is more likely to result from obstruction or erroneous positioning of a camera or the boom. In contrast, if the average number of observed fiducials per target declines gradually over a pre-determined long period of time (e.g., 4 hours), then the system determines that a dirty target is likely to be the cause of the problem, and an appropriate advisory message is generated.

In still another alternative embodiment, a log file is created and stored having records that indicate conditions detected by the process. In another alternative embodiment, the log file is read at the start of day to determine whether dirty targets were found the previous day and not cleaned. This information is useful in confirming the results of the fault detection process described above.

Figure 5:
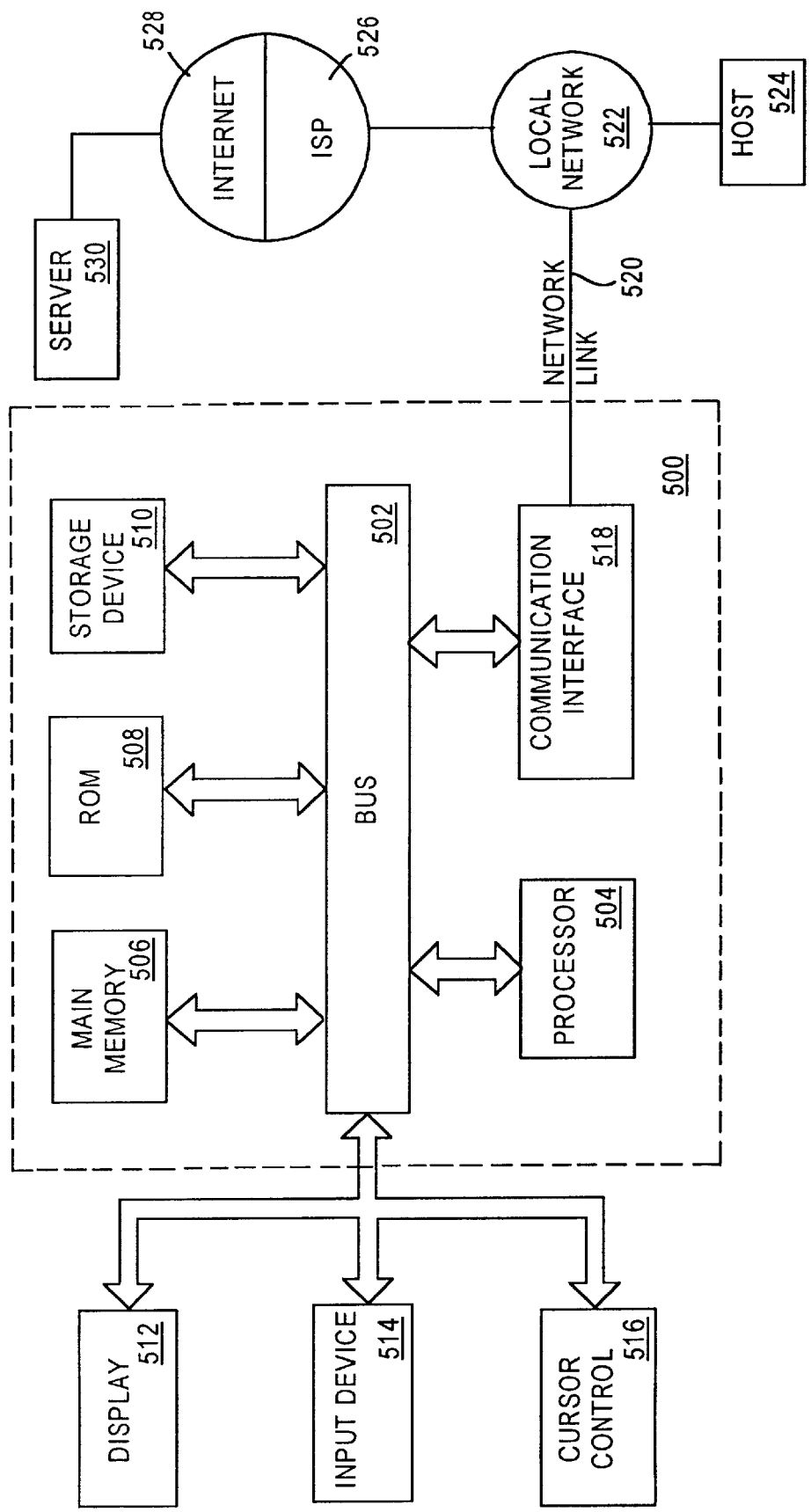
FIG. 5 is a block diagram of a computer system with which an embodiment may be implemented.

FIG. 5 is a block diagram that illustrates a computer system 500 upon which an embodiment of the invention may be implemented. Computer system 500 may be used as the arrangement for some or all of computer 32 or for the arrangement of an external computer or workstation that communicates with computer 32.

Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for automatically identifying faults in a machine vision measuring system. According to one embodiment of the invention, automatically identifying faults in a machine vision measuring system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the foil of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically identifying faults in a machine vision measuring system as described herein.

The received code may be executed by processor 504 as it is received, and/or stored in storage device 510, or other non-volatile storage for later execution. In this manner, computer system 500 may obtain application code in the form of a carrier wave.

In another embodiment, a wheel service machine is provided. One or more targets are observed by an electronic camera. The camera is connected to a machine vision system which receives the image of the target and uses the image to measure that target's position and attitude. The machine vision system consists of the following components: one or more targets, an electronic video camera, an illumination source, an image analysis computer that contains a video digitizer, a processor, and memory, and an output device. In the preferred embodiment, the output value is delivered through a VGA/SVGA display that communicates the target position and diagnostic information to a human technician or operator. The readings and diagnosis are displayed graphically and/or textually on the display. Optionally, an actuator or motor can be controlled by the output for automatic or semiautonomous motion control.

Each target is printed with a uniquely visually recognizable configuration such as a cluster or constellation of circles. A mathematical model of the configuration of circles is stored in the machined vision system. The model is matched against the image and the position and attitude data is extracted. In the preferred embodiment, the circles are made of retro-reflective material.

Although retro-reflective targets are described here, the system will equally well targets with diffusely reflective patterns and targets that are actively or internally self-illuminated.

The target position and attitude is expressed as a vector in the form (X, Y, Z, Pitch, Roll, Yaw). The vector data is displayed on a video monitor and also communicated to external equipment for purposes of numerical control, robotic guidance, and precision alignment applications.

In the preferred embodiment, the machine vision instrumentation is similar to that described by Jackson in U.S. Pat. No. 5,943,783, Method and apparatus for determining the alignment of motor vehicle wheels.

During normal operation, the targets are visually located by the machine vision system and their positions and attitudes arc displayed on the VGA/SVGA monitor. The visible portions of the targets (the constellation of circles) are measured and their positions are calculated in three-dimensional space. The positions are reported as a multi-dimensional vector of the form {X, Y, Z, pitch, roll, yaw} or alternatively (X, Y, Z, Camber, Toe, Roll).

This represents an idealized (geometrically pure and perfect) description of the target's visible characteristics. This ideal model can be transformed into a synthetic image by projecting it relative to a camera model. This transformation takes into account the geometry of the camera and of the target, and their positional and angular relationships to each other.

In this model, the target's position is expressed as {Xt, Yt, Zt, pitcht, rollt, yawt,} relative to the camera. The world coordinate system may be centered at a center of the camera. The parameters (pitchc, rollc, yawc) describe the angular orientation of the camera's viewing line. The model of the camera also includes a description of its viewing and image formation characteristics, including field of view (expressed in degrees), imager size (in photosites or pixels), and depth of field.

Once the camera and target model has been established, the system is ready to begin operation. Given a measured or theoretical camera position and target position, the model then predicts the appearance of the camera image.

This predicted ideal image represents what the camera would be expected to see, given an ideal, interference-free environment. In the preferred embodiment, the predicted image has characteristics similar to the input image (video-captured from the physical camera). The ideal image is then compared against the input image from which the position information was extracted.

The flaw localizer normalizes the predicted image in the brightness domain to match the intensity of the input image. It then arithmetically compares the predicted and input images and creates a flaw map for display. Image arithmetic processes of this sort are described in the literature. The flaw map contains only image deviations from the ideal image, so it is blank when no flaws are present.

In ideal cases, the input and the predicted images are identical. Differences between them can be caused by two factors:

1. Parameter deviations where the model parameters do not match the physical environment. The parameters must be set to match the environment.

2. Environmental deviations where something is present or absent in the physical environment that are not present in the model. Easy localization and identification of environmental differences is a primary value delivered by the current invention.

Environmental deviations can be due to fog, dusty atmosphere, obstruction of the camera's field of view, broken target (piece missing), dirt on the target, etc. Without a means to diagnose and identify the nature of the environmental deviations, it is very difficult for a non-technical operator to find a correct them. This embodiment provides a means for operators to quickly and non-verbally find and correct environmental problems.

The following describes a typical image flow through the system. A first description relates to a normal unobstructed case and a second description relates to a situation involving environmental obstructions.

In a first method of operation, an input image of a target is obtained under ideal conditions, viewed normally from 3 feet away with the target rotated 170 degrees in the roll axis. The target position extractor processes this image and computes a 'best fit' position. In this case, position extraction yields a detected pose (relative to the camera) at Xt=0, Yt=0, Zt=3, pitcht=0, rollt=+170, yawt=0. This position information is fed into the image predictor model that geometrically projects the target into a new synthetic image.

Not surprisingly, the synthetic predicted image very closely resembles the original input image from above, Both the input and predicted images are fed to the flaw localizer, which creates a flaw map.

Since the images are found to be identical, the flaw map is blank (zero). This indicates no flaws across the entire surface of the image. This is also as we expected because the environmental conditions were ideal and so the model assumptions held true.

With no problems, there is no need for diagnosis, so no messages and no diagnostic display are generated.

When image flaws arc present, an input image of a target is acquired. The target position extractor processes this image and computes a 'best fit' position. The target position extractor yields a detected pose, relative to the camera, at Xt-0, Yt=0, Zt=3, pitcht=0, rollt=0, yawt=0. This position information is fed into the image predictor model, which geometrically projects the target into a new synthetic image.

Both the input and predicted images are fed to the flaw localizer, which creates a flaw map. Since the predicted image differs substantially from original input image, the flaw map highlights the areas of difference. The flaw map contains a marked region that is visible in the image as a white area. For operation in certain environments, it may be advantageous to apply certain image processes to the flaw map in order to remove spurious noise. For example, in an environment in which camera focus may be imprecise, a low-pass filter or morphological erosion filter can serve to reduce the spurious noise content.

The surface area of the flaw region is measured numerically and compared to a preset threshold (ATHRESH). If the surface area is less than ATHRESH, then operation is judged to be acceptable. This is the normal unexceptional case and operation continues uninterrupted with the next measurement cycle.

When the measured area exceeds the threshold ATHRESH, an exceptional condition is indicated. This condition represents and inference that some environmental influence is interfering with normal operation. The objective is now to localize the flaw to enable the operator to take corrective action. A diagnostic image is constructed and displayed on the video display monitor.

The diagnostic condition is flagged with a visible indicator flag on the monitor. A diagnostic image is constructed, consisting of the original camera input image overlaid with the flaw map in color. Red or pink is preferred for the overlay. The flaw map from the previous step is used directly as the overlay. In the example shown above, the original image is pure black-and-white and the flaw overlay is shown as gray.

After the diagnostic display is constructed and presented on the monitor, the system returns to its normal measurement or tracking cycle. As before, any flaws in the input image are measured and independently detected and displayed for each measurement cycle. If the error condition is no longer present on the next cycle, then the diagnostic display is not shown and is normally replaced by a "normal operation" display. If an error condition is again detected on the next cycle, then a separate fresh diagnostic display is created and updated on the video monitor. With successive error display updates, changes arc made visible. This enables the operator to immediately see the effects of any corrective action that he has taken.

When an error condition is persistent for several consecutive measurement cycles, then it is inferred that the operator needs further or deeper assistance. In addition to the visible error indicator, other help messages may be given to the operator.

Preferably, in this embodiment, a flaw tracking mode is provided. When very high contrast targets are used (such as retroreflective targets), any obstructions in the resulting camera image are rendered invisible. The presence of an obstruction can then be inferred only through the absence of an expected target feature. The mechanisms described above will detect and localize that portion of the obscuring object that actually blocks the visible portion of the target. When the object is attached to the camera, it can be difficult for the operator to localize and identify the object. This describes an additional mechanism for diagnosing problems of this sort.

Problems in this class include dirt on the camera window or lens, cobwebs or dangling objects, faulty photo-sites in the camera, and fixed-pattern electronic noise.

When a problem has been flagged but the operator is having difficulty locating and identifying the offending object or cause, the operator can invoke the flaw tracking mode. In this mode, the diagnostic localization display is persistent and additive on the video monitor. When the flaw tracking mode is invoked, measurement cycles are made as described above. The difference is that with each successive cycle, the flaw map is accumulated in a separate image memory. The additive sum of these maps is displayed as the color overlay. As the target is moved in the field of view, the different aspects of the obscuration are explored and indirectly revealed. This has the effect of individually monitoring each photo-site in the camera imager. After the flaw is corrected, the system returns to its normal tracking measurement display.

The embodiments disclosed in this document are adaptable to other contexts. In particular, the embodiments are useful in any machine vision measuring system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for detecting a fault of a machine vision measuring system comprising:

a memory that stores an image formed by a camera of a target having a plurality of fiducials;

a data processor coupled to the memory and having stored instructions which, when executed by the data processor, cause the data processor to carry out the steps of:

creating and storing a list of values representing detected fiducials of the target based on the image;

comparing the values representing the detected fiducials to a plurality of second values representing true fiducials of the target in a stored model of the target;

based on the comparing step, selectively removing one or more of the detected fiducials from the list that fail to satisfy pre-determined criteria;

generating a warning message using the machine vision measuring system when fewer than a first pre-determined number of detected fiducials remain in the list.

2. An apparatus as recited in claim 1, wherein the instructions further cause the data processor to carry out the steps of:

determining a centroid of each of the detected fiducials;

determining an average difference value that represents an average of a plurality of difference values associated with the detected fiducials, wherein each difference value represents a difference in position of a centroid value of a detected fiducial as compared to a centroid value of the stored model.

3. An apparatus as recited in claim 1, wherein the instructions further cause the data processor to carry out the steps of:

generating an error message using the machine vision measuring system when the list contains fewer than a second predetermined number of detected fiducials.

4. An apparatus as recited in claim 1, wherein the instructions further cause the data processor to carry out the steps of:

generating an error message using the machine vision measuring system and terminating operation of the machine vision measuring system when the list contains fewer than a second predetermined number of detected fiducials.

5. An apparatus as recited in claim 1, wherein the instructions for carrying out the step of generating a warning message further comprise instructions for carrying out the steps of:

generating a message that prompts the user to clean the target;

receiving user input;

in response to user input, repeating the steps of forming, determining, and selectively removing.

6. An apparatus as recited in claim 1, wherein the instructions for carrying out the step of generating a warning message further comprise instructions for carrying, out the steps of:

generating a message that prompts the user to clean the target;

repeating the steps of forming, determining, and selectively removing;

determining that the target has been cleaned when the list contains a number of detected fiducials or equal to or greater than a second predetermined number.

7. An apparatus as recited in claim 1, wherein the instructions further cause the data processor to carry out the steps of:

determining a centroid of each of the detected fiducials;

determining an average difference value that represents an average of a plurality of difference values associated with the detected fiducials, wherein each difference value represents a difference of a centroid value of a detected fiducial as compared to a centroid value of the stored model corresponding to an actual fiducial of the target;

selectively removing from the list, values representing each detected fiducial having a difference value that is greater than a predetermined threshold value and more than a pre-determined multiple of the average deviation value.

8. An apparatus as recited in claim 1, wherein the instructions further cause the data processor to carry out the steps of:

determining a centroid of each of the detected fiducials;

determining an average difference value that represents an average of a plurality of difference values associated with the detected fiducials, wherein each difference value represents a difference of a centroid value of a detected fiducial as compared to a centroid value of the stored model corresponding to an actual fiducial of the target;

identifying one of the detected fiducials that has a greatest difference value;

selectively removing from the list, values representing the detected fiducial having the greatest difference value, when the difference value is greater than a predetermined threshold value and more than a predetermined multiple of the average deviation value.

9. A method of detecting a fault of a machine vision measuring system that includes a target having a plurality of fiducials and stored image of the target and the fiducials, the method comprising the steps of:

creating and storing a list of values representing detected fiducials of the target based on the image;

comparing the detected fiducials to a plurality of values representing true fiducials of the target in a stored model of the target;

selectively removing one or more of the detected fiducials from the list that fail to satisfy pre-determined criteria;

generating a warning message using the machine vision measuring system when fewer than a first predetermined number of detected fiducials remain in the list.

10. A method as recited in claim 9, further comprising the steps of:

determining a centroid of each of the detected fiducials;

determining an average difference value that represents an average of a plurality of difference values associated with the detected fiducials, wherein each difference value represents a difference of a centroid value of a detected fiducial as compared to a centroid value of the stored model corresponding to an actual fiducial of the target.

11. A method as recited in claim 9, further comprising the steps of:

generating an error message using the machine vision measuring system when the list contains fewer than a second predetermined number of detected fiducials.

12. A method as recited in claim 9, further comprising the steps of:

generating an error message using the machine vision measuring system and terminating operation of the machine vision measuring system when the list contains fewer than a second predetermined number of detected fiducials.

13. A method as recited in claim 9, wherein generating a warning message further comprises the steps of:

generating a message that prompts the user to clean the target;

receiving user input;

in response to user input, repeating the steps of forming, determining, and selectively removing.

14. A method as recited in claim 9, further comprising the steps of:

determining a centroid of each of the detected fiducials;

determining an average difference value that represents an average of a plurality of difference values associated with the detected fiducials, wherein each difference value represents a difference of the centroid of a detected fiducial as compared to a centroid value of the stored model corresponding to an actual fiducial of the target;

selectively removing from the list, values representing each detected fiducial having a difference value that is greater than a predetermined threshold value and more than a pre-determined multiple of the average deviation value.

15. A method as recited in claim 9, further comprising the steps of:

generating a message that prompts the user to clean the target;

repeating the steps of forming, determining, and selectively removing;

determining that the target has been cleaned when the list contains a number of detected fiducials or equal to or greater than a second predetermined number.

16. A method as recited in claim 9, further comprising the steps of:

determining a centroid of each of the detected fiducials;

determining an average difference value that represents an average of a plurality of difference values associated with the detected fiducials, wherein each difference value represents a difference of a centroid value of a detected fiducial as compared to a centroid value of the stored model corresponding to an actual fiducial of the target;

identifying one of the detected fiducials that has a greatest difference value;

selectively removing from the list, values representing the detected fiducial having the greatest difference value, when the difference value is greater than a predetermined threshold value and more than a pre-determined multiple of the average deviation value.

17. A computer-readable medium carrying one or more sequences of instructions for detecting a fault of a machine vision measuring system that includes a target having a plurality of fiducials and stored image of the target and the fiducials, wherein execution of the one or more sequences of instructions by one or more processors causes the one or more processors to perform the steps of:

creating and storing a list of values representing detected fiducials of the target based on the image;

comparing the detected fiducials to a plurality of values representing true fiducials of the target in a stored model of the target;

selectively removing one or more of the detected fiducials from the list that fail to satisfy pre-determined criteria;

generating a warning message using the machine vision measuring system when fewer than a first pre-determined number of detected fiducials remain in the list.

18. A computer-aided machine vision motor vehicle wheel alignment apparatus comprising:

a camera that forms an image of a target and a plurality of fiducials on the target;

a memory that stores the image formed by the camera;

a data processor coupled to the memory and having stored instructions which, when executed by the data processor, cause the data processor to carry out the steps of:

creating and storing a list of values representing detected fiducials of the target based on the image;

comparing the detected fiducials to a plurality of values representing true fiducials of the target in a stored model of the target;

selectively removing one or more of the detected fiducials from the list that fail to satisfy pre-determined criteria;

generating a warning message using the machine vision measuring system when fewer than a first pre-determined number of detected fiducials remain in the list.

* * * * *